United States Patent Office 2,850,529
Patented Sept. 2, 1958

2,850,529

BIS QUATERNARY AMMONIA ALKYL UREAS

Ellis Rex Pinson, Jr., Jackson Heights, N. Y., assignor to Chas. Pfizer & Co., Inc., Brooklyn, N. Y., a corporation of Delaware No Drawing. Application March 28, 1955
Serial No. 497,425

3 Claims. (Cl. 260—553)

This invention is concerned with a new class of highly effective ganglionic blocking agents. In particular, these compounds are the di-quaternary salts of a group of diamines.

Various di-quaternary ammonium type compounds have been suggested in the past as ganglionic blocking agents. These are useful in the treatment of certain disease conditions such as hypertension. The di-quaternary salts of the present invention are distinctly superior for this type of use.

The diamino compounds from which the active quaternary compounds of this invention may be prepared are represented by the following structural formula

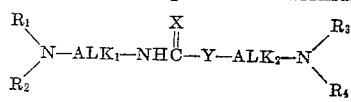

wherein $R_1$ and $R_3$ are selected from the group consisting of the lower alkyl groups having not more than three carbon atoms and $\beta$-hydroxyalkyl groups having from two to three carbon atoms; $R_2$ and $R_4$ are lower alkyl groups having not more than three carbon atoms; $ALK_1$ and $ALK_2$ are lower alkylene radicals containing at least two carbon atoms; X is a divalent radical selected from the group =S, and =O; and Y is a divalent radical selected from the group —O—, and —S—, and —NH—.

In the foregoing structural formula $R_1$ and $R_3$ are the methyl, ethyl, propyl, isopropyl, $\beta$-hydroxyethyl, or $\beta$-hydroxypropyl groups; $R_2$ and $R_4$ are the methyl, ethyl, propyl, or isopropyl groups; or $R_1$ and $R_2$, and/or $R_3$ and $R_4$ may be joined to form a monocyclic saturated heterocyclic amino radical such as the pyrrolidino, piperidino, or morpholino groups attached to the ALK groups through their heterocyclic nitrogen atoms; and X represents a double bonded oxygen or sulfur atom. Of course, such a double bonded oxygen or sulfur atom may be in tautomeric equilibrium with the hydroxyl or thiol form due to the presence of the —NH— group adjacent to the carbon atom to which they are attached. $ALK_1$ and $ALK_2$ each may have from two to six carbon atoms and they may be the same or different. However, they must be so constituted that the total number of atoms in the straight chain between the two tertiary amino nitrogen atoms is less than nine. This is illustrated by the following formula

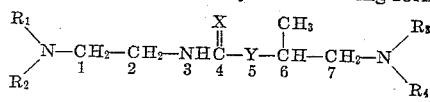

In this particular example, the tertiary amino atoms are separated by seven atoms in a straight chain.

Conversion of these diamino compounds to their di-quaternary ammonium salts yields the active compounds which have the structure

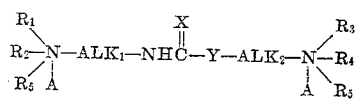

wherein

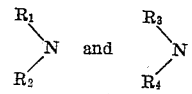

are selected from the class consisting of lower dialkylamino groups wherein the alkyl groups contain not more than three carbon atoms such as the dimethylamino, diethylamino, and the methylethylamino groups, the pyrrolidino, the morpholino, and the piperidino groups; $R_5$ is selected from the group consisting of a lower alkyl group having not more than three carbon atoms and a $\beta$-hydroxyalkyl group having from two to three carbon atoms; A is a pharmacologically acceptable anion such as chloride, bromide, iodide, sulfate, methosulfate, tartrate, acid tartrate, gluconate, citrate, acetate and propionate; and $ALK_1$, $ALK_2$, X and Y have the same meaning as above.

The valuable compounds of this invention may be prepared by a variety of methods. For example, a dialkylaminoalkylamine may be heated with urea. The resulting symmetrically disubstituted dialkylaminoalkyl urea may then be treated with a quaternizing agent such as an alkyl halide or alkyl sulfate to obtain the desired di-quaternary ammonium salt. This is illustrated in the following equations:

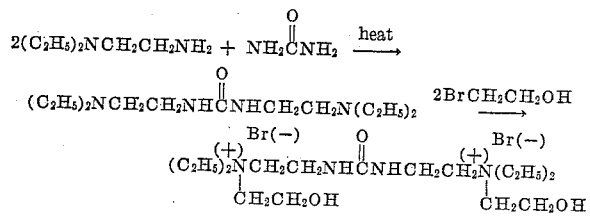

In this particular example $\beta$-bromoethanol has been used as the quaternizing agent. Of course, an ether such as $\beta$-bromoethyl ethyl ether, or $\beta$-chloropropyl ethyl ether or an ester such as $\beta$-chloroethyl acetate, or $\beta$-bromoethyl propionate of such a $\beta$-hydroxyalkyl halide may be substituted in the reaction to give a compound of this invention.

A further method for the preparation of these valuable compounds involves treatment of a dialkylaminoalkylamine with phosgene and subsequent conversion of the resultant di-tertiary amine to the di-quaternary ammonium salt by treatment with a quaternizing agent as above. The following equation illustrates this method.

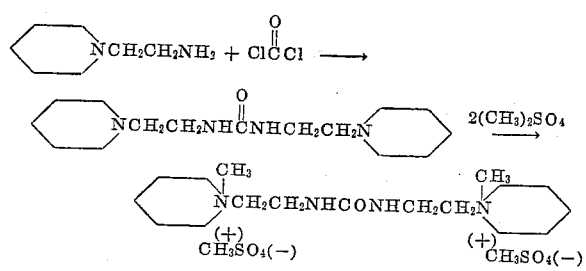

To obtain unsymmetrical compounds, convenient intermediates are dialkylaminoalkyl isocyanates and dialkylaminoalkylisothiocyanates. Although the dialkylaminoalkyl isocyanates and isothiocyanates are difficult to prepare in pure form, they may be used in crude form as their salts such as the hydrochlorides, alkylsulfonates, and arylsulfonates. Treatment of such materials with dialkylaminoalkylamines, dialkylaminoalkanols or dialkylaminoalkylthiols yields the corresponding urea, thiourea, carbamate, thiocarbamate or dithiocarbamate. The following equations illustrate this type of preparation wherein $R_1$, $R_2$, $R_3$, $R_4$ and X have the same meaning as above. B is a halide or alkyl sulfate radical.

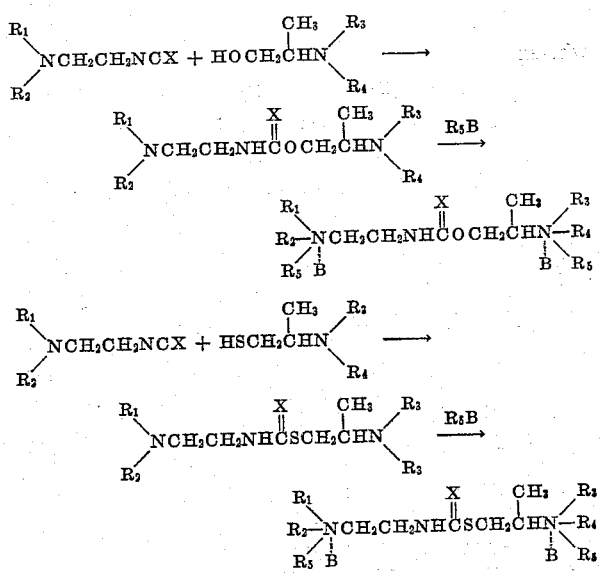

β-Haloalkyl chloroformates are useful intermediates for the preparation of certain of the valuable compounds of this invention. Treatment of such an intermediate with about one equivalent of a β-dialkylaminoalkylamine yields the corresponding β-dialkylaminoalkylcarbamyl β-chloralkyl ester which on treatment with an appropriate secondary amine yields a di-tertiary amine intermediate for the products of this invention. This diamine is then quaternized to yield a salt of this invention. The equation below illustrates this method wherein $R_1$, $R_2$, $R_3$, $R_4$, and B have the same meaning as above.

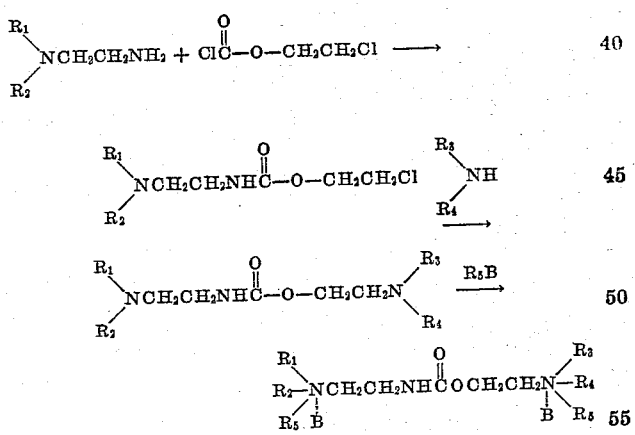

It will be noted from the above description that many of these valuable salts are prepared from the corresponding di-tertiary amines of this invention by treatment with an alkyl halide. Thus the resulting anion is the chloride, bromide, or iodide ion. These compounds may be converted to the salts of other acids by a number of methods. Thus on treatment of the quaternary halide with an aqueous solution of the silver salt of another acid such as silver nitrate or silver acetate, the silver halide is precipitated and the di-quaternary di-nitrate or di-acetate is formed.

A further method which is highly useful for this purpose comprises contacting the quaternary halide with a basic ion-exchange resin, preferably a highly basic compound, such as the Rohm & Haas compound Amberlite IRA–400, in the basic form. This resin is a polyquaternary ammonium compound which is prepared by chloromethylating a highly cross-linked copolymer of styrene and divinyl benzene and treatment of the chloromethylated material with a tertiary amine such as trimethylamine. There is thereby formed the quaternary ammonium hydroxide which may then be neutralized with the appropriate acid, for instance, citric acid, tartaric acid, propionic acid, acetic acid, nitric acid, sulfuric acid, and so forth. Alternatively, the resin may be converted by means of the acid, the salt of which it is desired to convert the quaternary salt and the ion-exchange resin is then contacted with an aqueous solution of the alkyl ammonium halide. The salt can then be recovered from the eluate by a number of methods such as evaporation and solvent precipitation.

The following examples are given by way of illustration and are not intended to limit the scope of the invention. In fact, many widely varying embodiments are possible without departing from the spirit and scope of the herein described invention; it is to be understood that this invention is to be limited only by the specific wording of the appended claims. In each of these examples, temperatures are given in degrees centigrade and pressure in millimeters of mercury.

EXAMPLE I

*1,3-bis(β-diethylaminoethyl)urea*

β - Diethylaminoethylamine, 25 g. (0.215 mole) and urea, 6.48 g. (0.108 mole) were mixed and refluxed for three to four hours. The mixture was kept at room temperature for 48 hours and distilled. The product was a yellow oil, B. P. 155–162°/1 mm., $n_D^{22}$ 1.4823. The infrared absorbtion curve of this material exhibits the typical maxima of a monoalkyl amide.

EXAMPLE II

*1,3-bis(β-diethylaminoethyl)urea dimethiodide*

Five grams of the product from Example I was mixed with 25 ml. of ethanol and 25 ml. of methyl iodide. After storage for several days at room temperature the solvent was evaporated and the resulting dark oil triturated with acetone to yield the white crystalline product. This crude product was recrystallized from ethanol to give the purified product, M. P. 137–138° dec.

EXAMPLE III

*1,3-bis(β-diethylaminoethyl)urea dimethonitrate*

5.4 g. of the product obtained in Example II was treated in the absence of light with an aqueous solution containing 3.4 g. of silver nitrate. The silver iodide that precipitated was collected and the di-quaternary di-nitrate recovered from the filtrate.

EXAMPLE IV

*1,3-bis(β-(1-piperidyl)ethyl) urea*

Two molar equivalents of β-(1-piperidyl)ethylamine was cautiously added to a solution of one molar equivalent of phosgene in benzene. After the reaction had subsided the mixture was refluxed for about two hours, cooled, and washed with dilute aqueous acid. The aqueous layer was then made basic and the amine extracted with chloroform. A portion of this chloroform solution was treated with an excess of β-bromoethanol and kept at room temperature for several days after which time the di-β-hydroxyethylbromide salt separated. The amine was recovered from the remainder of the above chloroform extract by evaporation of the solvent and distillation.

What is claimed is:
1. The di-quarternary salts having the structure

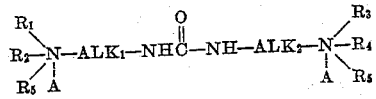

wherein

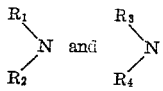

are selected from the class consisting of lower dialkyl-amino groups wherein the alkyl groups contain not more than three carbon atoms, the pyrrolidino, the morpholino, and the piperidino groups; $R_5$ is selected from the group consisting of a lower alkyl group having not more than three carbon atoms and a β-hydroxyalkyl group having from two to three carbon atoms; $ALK_1$ and $ALK_2$ are lower alkylene radicals having from two to six carbon atoms and the total number of atoms in a straight chain between the two quaternary nitrogen atoms is less than nine; and A is a pharmacologically acceptable anion.

2. 1,3-bis(β-diethylaminoethyl)ureadimethiodide.
3. 1,3-bis(β-diethylaminoethyl)ureadimethonitrate.

References Cited in the file of this patent
UNITED STATES PATENTS

| | | |
|---|---|---|
| 2,050,557 | Bockmuhl | Aug. 11, 1936 |
| 2,220,508 | Bock | Nov. 5, 1940 |
| 2,501,783 | Morgan | Mar. 28, 1950 |
| 2,667,493 | Slack et al. | Jan. 26, 1954 |
| 2,668,854 | Miescher et al. | Feb. 9, 1954 |
| 2,692,285 | Robinson | Oct. 19, 1954 |

FOREIGN PATENTS

| | | |
|---|---|---|
| 497,043 | Great Britain | Dec. 12, 1938 |

OTHER REFERENCES

Weisel et al.: Jour. Am. Chem. Soc., vol. 67, pages 1055–56 (1945).